Patented Feb. 11, 1930

1,746,665

UNITED STATES PATENT OFFICE

HOWARD W. MATHESON, OF MONTREAL, AND FREDERICK W. SKIRROW, OF SHAWINIGAN FALLS, QUEBEC, CANADA, ASSIGNORS TO CANADIAN ELECTRO PRODUCTS COMPANY, LIMITED, OF MONTREAL, CANADA

PROCESS OF MAKING SYNTHETIC GUMMY OR RESINOUS MATERIAL

No Drawing.   Application filed February 28, 1927.  Serial No. 171,719.

This invention relates broadly to a process for the manufacture of resinous or gummy materials by the interaction or treatment of the esters of unsaturated alcohols or of hypothetical alcohols with aldehydes or aldehydic bodies, and to the product of such treatment.

In particular, the invention relates to a process for the manufacture of resinous or gummy materials by the interaction or treatment of activated vinyl esters with an aldehyde or aldehydic body and to the product produced thereby.

It has been stated in the literature and prior patents that vinyl esters may be polymerized by treatment in various ways. Catalysts such as hydrogen peroxide have been mentioned. Results obtained when working with vinyl acetate according to the instructions of prior patents were most erratic. Sometimes the ester would polymerize readily; at other times under equal or more favorable conditions substantially no polymer would be obtained. Investigation led to the knowledge that vinyl esters suitably treated with oxygen and preferably exposed to rays of natural or artificial light were active and would polymerize readily, whereas vinyl esters from which oxygen had been excluded during and after manufacture were inactive and would not polymerize. For example, vinyl acetate made with exclusion of air and then suitably exposed to oxygen and light would polymerize merely on standing under atmoshperic conditions, whereas a part of the same lot of vinyl acetate not treated with oxygen and light would not polymerize on standing or by application of heat or heat and pressure, or even by heating with hydrogen peroxide at 100° C. under pressure for twenty-four hours. The degree of polymerization of active vinyl acetate was not greater using hydrogen peroxide as a catalyst than when no catalyst was used. The polymer, in either case, when isolated was found to be, as described in the art, a clear, hard, resin-like mass. (See Canadian Patent No. 226,694, dated November 28th, 1922, and U. S. Patent No. 1,586,803, dated June 1st, 1926.)

The conditions applying to the polymerization of vinyl esters were found to apply also to the reaction of vinyl esters with aldehydes and aldehydic bodies such as acetals; that is to say, an inactive ester which would not polymerize would not react with aldehydes while an active ester which would polymerize would also react with aldehydes with or without catalysts.

The products obtained by reacting vinyl esters and aldehydes are totally different from the polymers of the esters, as will now be shown. For example, if active vinyl acetate is polymerized by any of the methods given in the literature, a clear, hard, resinlike mass is obtained on removal of the unchanged vinyl acetate. This material is tough, hard and rubbery, and when dissolved in solvents such as ethyl acetate gives a very high viscosity product. The viscosity of such a body in solution of a known concentration is a good indication of the extent of the polymerization, and when the vinyl acetate is thus polymerized by the methods described in the literature the viscosity is practically the same for all methods, indicating that a very definite degree of polymerization is thus obtained. (This is further confirmed by the statements in Canadian Patent No. 265,172, dated October 19th, 1926, in which the polymer is claimed to contain 18–20 molecules.) It has been claimed in the literature (see U. S. Patent No. 1,586,803) that the utilization of organic solvents during the polymerization process alters the nature of the product, presumably by controlling the degree of polymerization. No difference is found in the degree of polymerization or the physical or chemical properties of the product by the use of solvents, the consistency, viscosity and nature of the polymerized body being the same in presence of solvents as if polymerized alone. The inventors have carried out the polymerization of vinyl acetate in the presence of acetone, alcohol, benzene, petroleum, ether, carbon-tetrachloride, butyl alcohol, glycol, glycerine, ethyl acetate, glycol monoethyl ether, acetic acid, camphor, butyl acetate and pyridine, and the finished products in all cases are substantially identical, provided that the unchanged vinyl acetate and the solvent used are completely removed, the material in all cases being a clear, hard, resin-like body of a rubbery nature when heated, which on heating does not melt but softens and becomes plastic, tough and rubbery. Furthermore, the material has a very high viscosity when dissolved in such solvents as ethyl acetate. The statements in the patent literature as to the variations in the polymer due to different solvents are apparently due to the incomplete removal of the unchanged vinyl ester or the solvent or both.

The product made by treating active vinyl acetate with aldehydes, etc., by the methods to be described later, on the other hand, gives a very soft, resinous or gummy mass which at low temperatures is very brittle and if masticated in the mouth becomes very plastic, taking up approximately 15% of water. The viscosity of the body dissolved in ethyl acetate, for example, is very low as compared to the same amount of polymer dissolved in the same solvent. Thus, using a 10% solution (10 gr. dissolved in 100 cc.) of the two bodies and a 20 cc. pipette, the following figures give the time of outflow at 20° C.;

|  | Seconds |
|---|---|
| Ethyl acetate alone | 27 |
| 10% solution acetaldehyde-vinyl acetate product, (made from 100 pts. vinyl acetate and 12 parts acetaldehyde) | 29 |
| 10% solution vinyl acetate polymer | 133 |

In carrying out the process according to this invention, the vinyl ester suitably conditioned is heated with an aldehyde or aldehydic body, such as an acetal, in presence or absence of catalyst and in presence or absence of water. Light it is found accelerates the reaction to a considerable extent. The addition of small quantities of water does not seem to have any marked effect on the reaction. As already outlined, the physical properties of the bodies thus produced are entirely different from the polymerized products of the esters, and from analysis of the materials produced, a certain amount of the aldehyde enters into the reaction. The amount of aldehyde combining when 15 parts of acetaldehyde and vinyl acetate are used is from 3% to 5% by weight of the reaction product and may vary within considerable limits. It has furthermore been found that the softness and plasticity of the body, when definite products such as vinyl acetate and acetaldehyde are used, depend upon the amount of acetaldehyde added to the reaction mixture. Thus, for example, 100 parts vinyl acetate treated with 3 parts (by volume) acetaldehyde gives a body considerably softer and more plastic than the vinyl acetate polymer. If 12 to 15 parts of acetaldehyde are used, a much softer body is obtained. This latter body, when containing a normal amount of water (approximately 13% to 16%) is hard at 10° C. and soft, ductile and plastic at body temperature, namely, 37° to 38° C., and in respect of these properties is practically identical with gum chicle, except that it has greater ductility than the chicle. When anhydrous, this material becomes liquid on heating and at 75° C. is of the consistency of thin treacle and at 160° C. is a thin, limpid liquid. If 50 parts acetaldehyde to 100 parts vinyl acetate are used in carrying out the reaction, the produced body is still softer, and in presence of water at body temperature is much softer and more plastic than is gum chicle. The melting point of the anhydrous material thus prepared is also considerably lower than if 12 parts, by volume, of acetaldehyde is used.

Furthermore, the nature of the body, produced from a given ester, depends upon the aldehyde; thus, for example, the product made by the treatment of vinyl acetate with butyraldehyde is considerably softer and more fluid, either alone or in presence of moisture, than is the body made from vinyl acetate and the same molecular percentage of acetaldehyde. Utilizing formaldehyde, the body is somewhat less soft and plastic than is that when utilizing the same molecular percentage of acetaldehyde. In general it would seem as if the softness and plasticity of the body formed increases with the increasing molecular weight of the aldehyde used. This applies particularly to the utilization of the normal aliphatic aldehydes.

In carrying out the reaction the vinyl ester admixed with the aldehyde is preferably treated at approximately 100° C., the pressure depending upon the vinyl ester and aldehyde utilized. The reaction, however, may be carried out without pressure at a great variety of temperatures from room temperature upwards and under a reflux condenser.

The following examples are given as illustrative of the invention, but it is understood that the same is not limited to the temperatures, catalysts or methods of treatment outlined.

*Example I.*—100 parts by volume of active vinyl acetate and 12 parts by volume of acetaldehyde are placed in an autoclave for three hours at a temperature of 100° C. The material is then allowed to run out of the autoclave into water and is steam distilled until all the unchanged vinyl ester and aldehyde are removed and recovered. The material thus obtained contains approximately 13% to 16% of water and is hard at 10° C. but soft, plastic and ductile at body temperature. If the water is removed, the material at a temperature of about 20° C. is a very brittle solid and is capable of again readily taking up approximately 13% to 16% of water. The material even when dry is plastic at slightly above room temperature.

*Example II.*—100 parts of active vinyl acetate are admixed with 12 parts of freshly distilled acetaldehyde and .01 parts of hydrogen-chloride. The material is then heated as in Example I for three hours. Approximately 80% of the materials used is recovered as a gummy, resinous mass on treatment with steam as in the previous example. The physical properties are the same as those of the product in the previous example.

*Example III.*—100 parts of activated vinyl acetate are admixed with 12 parts of acetaldehyde and 3 to 10 parts of 3% hydrogen peroxide are added. On heating at 100° C. for three hours a similar yield is obtained to that given in Example II. The physical properties also are the same as those of the product in previous examples.

A multiplicity of examples might be given utilizing other aldehydes than acetaldehyde and other vinyl esters. Butyraldehyde, for example, when combined with vinyl acetate as in the examples cited above, gives a somewhat softer product than that from acetaldehyde. This product is softer both when anhydrous and when containing water. Various other esters might be used besides vinyl acetate, such as vinyl butyrate, vinyl propionate, etc., and similar results obtained, the properties, of course, varying somewhat with each combination used.

Furthermore, vinyl esters made utilizing other acetylenes than ordinary acetylene, such as those esters made from allylene, dipropargyl reacted with organic carboxylic acids, or substituted acids such as chloracetic acid, are intended to be included under the term "vinyl esters" and may be treated in accordance with the methods herein described.

The materials produced in accordance with the above disclosure have, as already mentioned, a low melting point and are capable of taking up water and are found to be excellent substitutes for gum chicle in the manufacture of chewing gum, their degree of suitability, of course, varying with the raw materials used. A product made from vinyl acetate and acetaldehyde or butyraldehyde possesses excellent properties in this connection, having to a great degree the property of extensibility, especially in a moistened condition, great plasticity during mastication, insolubility, freedom from taste and smell, and is capable of mixing with gum chicle in practically all proportions.

Thus, although the material itself may be utilized alone in place of chicle, it has the advantage of also being capable of being admixed with the present base for chewing gum. The product also can be admixed with all the ordinary constituents utilized in the manufacture of chewing gum, such as flavoring, sweetening materials, etc.

It may be pointed out that when only a small percentage of an aldehyde is used—for example, 3 parts acetaldehyde to 100 parts of vinyl acetate—undoubtedly a mixture of vinyl polymer and the reaction product of vinyl acetate and aldehyde is obtained. This is more or less evident from the fact that the material produced is of a somewhat rubbery nature and possesses a certain degree of resiliency. If the wet material is drawn into threads and the tension then released, the material contracts and distinctly exhibits what is called elastic memory. When 12% of acetaldehyde, for example, is used with vinyl acetate, the material when containing the normal amount of water, may be stretched into threads and has no recovery or elastic memory whatever in distinction from the material which contains a certain amount of polymer. It may also be pointed out that, if the polymer is prepared separately and a small percentage—say 10%—is admixed with a soft vinyl acetate-aldehyde product, such as that made with 15 volumes of acetaldehyde and 100 volumes of vinyl acetate, this mixture has different physical characteristics to the acetaldehyde-vinyl acetate reaction product, in that although it may be soft enough to utilize as chewing gum, the material exhibits certain properties characteristic of the polymer, namely, a certain amount of elastic memory and a certain resiliency on being masticated.

This invention, therefore, contemplates not only the main reaction product as described, but the utilization of the polymer itself when admixed with a suitable amount of the softer reaction product of vinyl esters and aldehydic bodies.

Products of different consistencies made as herein described are freely miscible to produce mixtures of desired consistency. Thus, a soft product may be rendered physically harder by incorporation of a suitable amount of a harder product or a hard product may be softened by addition of a softer product. Incorporation of vinyl ester polymers is found to have a hardening effect on soft reaction products.

It has been discovered also that the nature of the vessel in which the reaction is carried out has a marked influence on the result. Vessels of glass, porcelain, enamelware or aluminum enable the realization of the desired results, but vessels of iron and copper are found to be most unsuitable and impossible of use. Apparently, these materials or their salts serve as deactivators of the active vinyl ester.

Under the term "aldehydic bodies" is intended to be included all bodies having the grouping distinctive of aldehyde, namely:

All such bodies are useful to a greater or lesser extent although the saturated aldehydes of the aliphatic series are found to be the most satisfactory. Furthermore, bodies of the acetal type give reaction products of the same type as that given by the corresponding aldehydes. Any body may be utilized for carrying out the reaction which will yield an aldehyde under the conditions of carrying out the same, provided that they do not also generate other materials that inhibit the reaction or deactivate the vinyl ester.

Having thus described our invention, what we claim is:—

1. A process which includes reacting together an activated vinyl ester and an aldehydic body.
2. A process which includes reacting together an activated vinyl ester and an aldehydic body with exposure to light.
3. A process which includes reacting together an activated vinyl ester and a saturated aliphatic aldehyde.
4. A process which includes reacting together an activated vinyl ester and an aliphatic aldehyde.
5. A process which includes reacting together an activated vinyl ester and acetaldehyde.
6. A process which includes reacting together activated vinyl acetate and an aldehydic body.
7. A process which includes reacting together activated vinyl acetate and an aldehydic body with exposure to light.
8. A process which includes reacting together activated vinyl acetate and an aliphatic aldehyde.
9. A process which includes reacting together activated vinyl acetate and acetaldehyde.
10. A process which includes reacting together an activated vinyl ester and an aldehydic body in presence of hydrogen peroxide as catalyst.
11. A process which includes bringing together activated vinyl acetate and an aldehyde in the volumetric proportion of 100 parts of ester to from 3 to 50 parts of aldehyde.
12. A process which includes bringing together activated vinyl acetate and an aldehyde at a temperature between 25° and 100° C.
13. A process which includes bringing together activated vinyl acetate and an aldehyde at a temperature between 25° and 100° C. under pressure.
14. A process which includes bringing together activated vinyl acetate and an aldehyde with heating.
15. A process which includes bringing together activated vinyl acetate and an aldehyde with heating and pressure.
16. A process which includes reacting together a vinyl ester and an aldehydic body, and treating the resulting product for removal of any unchanged ester and aldehyde.
17. The product resulting from the reaction of an active vinyl ester and an aldehydic body.
18. The product resulting from the reaction of an active vinyl ester and an aliphatic aldehyde.
19. The product resulting from the reaction of an active vinyl ester and acetaldehyde.
20. The product resulting from bringing together active vinyl acetate and an aldehydic body.
21. The product resulting from bringing together active vinyl acetate and a saturated aliphatic aldehyde.
22. The product resulting from bringing together active vinyl acetate and acetaldehyde.
23. A composition of matter being a mixture of products resulting from the reaction of a plurality of lots of active vinyl ester with different proportions of aldehydic bodies.

In witness whereof, we have hereunto set our hands.

HOWARD W. MATHESON.
FREDERICK W. SKIRROW.